(Model.)

J. F. GORDON.
GRAIN BINDER.

No. 266,958.

Patented Oct. 31, 1882.

Attest.

Sidney P. Hollingsworth
Robt. L. Miller

Inventor.

J. F. Gordon
By P. T. Dodge
Atty.

(Model.)

J. F. GORDON.
GRAIN BINDER.

No. 266,958. Patented Oct. 31, 1882.

Attest.
Sidney P. Hollingsworth
Robt. L. Miller

Inventor.
James F. Gordon
By his Atty.
Philip T. Dodge.

(Model.)

J. F. GORDON.
GRAIN BINDER.

No. 266,958. Patented Oct. 31, 1882.

Attest.
Sidney P. Hollingsworth
Robt. S. Miller

Inventor.
James F. Gordon
By Philip T. Dodge
attt

(Model.)

J. F. GORDON.
GRAIN BINDER.

No. 266,958.

Patented Oct. 31, 1882.

Attest.
Sidney P. Hollingsworth
Robt. L. Miller

Inventor.
James F. Gordon
By P. T. Dodge
Atty.

(Model.)

J. F. GORDON.
GRAIN BINDER.

No. 266,958.   Patented Oct. 31, 1882.

Attest.
Sidney P. Hollingsworth.
Robt. S. Miller.

Inventor:
James F. Gordon
By his Attorney
Philip T. Dodge

UNITED STATES PATENT OFFICE.

JAMES F. GORDON, OF ROCHESTER, NEW YORK.

GRAIN-BINDER.

SPECIFICATION forming part of Letters Patent No. 266,958, dated October 31, 1882.

Application filed November 15, 1881. (Model.)

*To all whom it may concern:*

Be it known that I, JAMES F. GORDON, of Rochester, in the county of Monroe and State of New York, have invented certain Improvements in Grain-Binders, of which the following is a specification.

This invention relates to that class of grain-binders in which the cord-band is secured by tying its ends together.

The invention consists in a tyer composed of two differential rotary vibrating fingers, moving in parallel planes in such manner as to wind the cord around them, and to clasp the ends of the cord between their adjacent faces for the purpose of drawing them through the loop of the knot.

It also consists in the peculiar formation of the said tying-fingers; also, in a peculiar arrangement of mechanism for imparting motion to the fingers; in the improved construction and arrangement of a rotary cord-clamping device, and in mechanism for turning the same and for moving it to and from the knotter, as hereinafter explained; in mounting the rotary cord-clamping device on a non-rotating device which co-operates therewith to move it lengthwise upon the spindles which sustain the knotting or tying fingers; also, in a stripping or knot-delivering device of peculiar construction, and in other minor details, which will be hereinafter described.

In the accompanying drawings I have represented my improved tying devices in combination with a vibratory binding-machine of the well-known Gordon pattern, substantially such as represented in the Patents Nos. 169,258, 194,817, 198,104, and subsequent patents granted to me; but it is to be understood that the devices may be applied for binding-machines of any ordinary or suitable construction.

Referring to the accompanying drawings.

In order that the construction of my machine may be the more readily understood, I will first describe the construction and operation of the knot-tying and cord cutting and clamping devices, and afterward describe the arrangement of the mechanism by which they are sustained and operated.

A and B designate the two tying or knotting fingers, the former on the upper end of a vertical spindle, $a$, and the latter on the upper tapered end of a tubular spindle, $b$, through which the spindle $a$ passes loosely, as shown in Figs. 1, 2, 3, and 8, &c., thus permitting the two fingers to be rotated at one time in unison and at another differentially, as will be hereinafter explained. The two fingers, which are similar in size and form, extend horizontally from the spindles in parallel planes at right angles to the axis of rotation, and are capable of being turned so as to stand one directly over and parallel with the other, as in Figs. 4 and 10, or so as to be separated and extended in different directions from the axis of the spindles, as in Figs. 1, 2, 3, 7, &c. Each finger tapers from the inner end or heel toward the outer end or point, to facilitate the discharge of the loop, and is also curved slightly forward in a horizontal direction, to enable it to grasp and hold the cord readily and firmly.

It will be seen that the two fingers revolve in parallel planes, and that when closed together—that is to say, brought one over the other—a free horizontal space exists between them sufficient to admit the ends of the applied band. The upper finger, A, is provided on its convex side, near and extending to its end, with a depending lip, d, and the lower finger is provided with a corresponding upright lip, e, on its concave side, the two lips being constructed to bear against each other when the fingers are closed together, in order to retain the ends of the cord within the space between the fingers above referred to and draw them through the loop of the knot.

It will be perceived that in my device the ends of the cord are retained between the adjacent faces of two fingers, and that in this regard the device differs from those in which the ends are caught between a shoulder on the side of a finger and a clamp moving against the rear side of the shoulder.

It will also be observed that the fingers shown herein differ from the hooks formed circumferentially on the edges of circular heads, as in my application filed September 20, 1880.

I am aware of Letters Patent No. 57,138, for a wire-twisting device wherein two concentric fingers having their ends curved toward each other and slotted to pass through each other are arranged to close together for the purpose of drawing wire inward toward the center and holding the same while being twisted. To a device of this character I make no claim.

Figure 1:
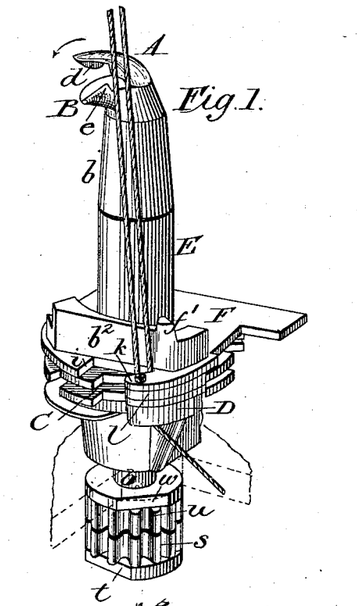
Figures 1, 2, 3, and 4 are perspective views of the knotting and cord-holding devices separated from the remainder of the machine, the different views illustrating the positions of the parts during the different steps or stages in the formation of the knot.
Figure 2:
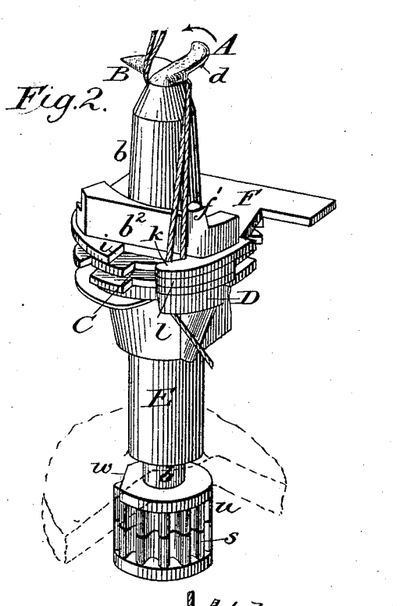
Figure 3:
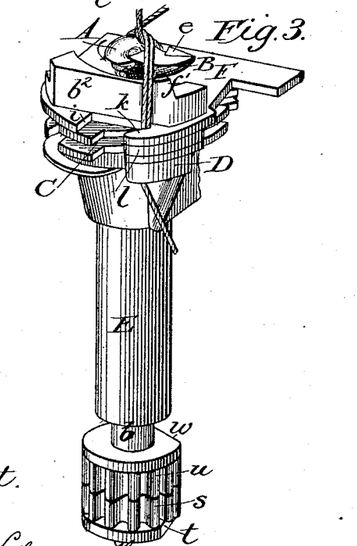
Figure 4:
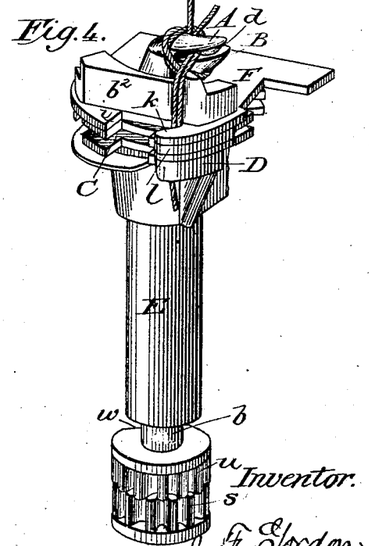
Figure 10:
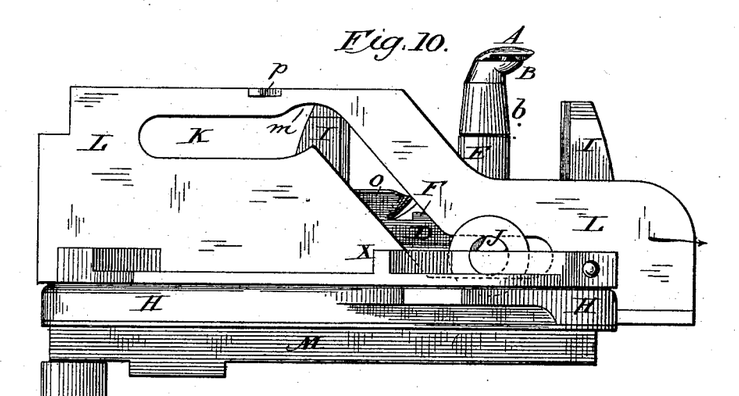
Fig. 10 is a rear side elevation of the parts shown in Figs. 6 and 7.

In operating the present tyer the two fingers are turned apart, as in Fig. 1, and the cord presented in an upright position at the side of the tyer, and its ends held below the same. The fingers are then turned forward in the direction indicated by the arrow without changing their relative positions, whereupon the finger B, standing in advance of the upper finger, engages the cord and winds the same into a loop, as indicated in Figs. 1 and 2, around the tapered spindle. As the parts complete their first revolution, or just after, the ends of the cord pass over the lower and below the upper finger, as indicated in Fig. 3. The fingers are then closed together, as represented in Figs. 4 and 10, clasping the ends of the cord between them, after which the knot is completed by forcing or drawing the loop off over the ends of the fingers while the ends are held between the fingers, so that the loop is compelled to pass over and around said ends of the cord, and thus complete the knot. If the ends are short, they may be drawn completely through the loop; but it is preferred to leave them of such length that they will be drawn through the main loop in the form of a bow, whereby the tightening of the knot is rendered more certain. This bow can only be released by opening the fingers, which is done after the completion of the knot.

In order to secure the best action of the tying device, it is desirable that the end of the applied band be held and gradually slackened toward the tyer during the formation of the knot. I therefore provide a rotary clamping device, which moves toward the tyer as the latter forms the main loop.

Figures 7, 8:
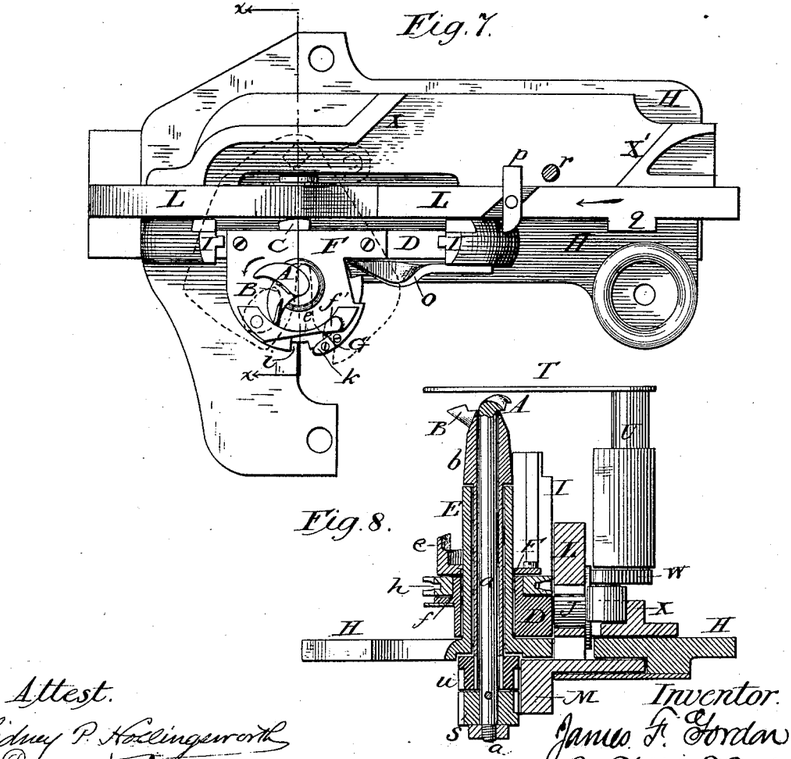
Fig. 7 is a top plan view of the same.
Fig. 8 is a vertical cross-section on the line $x\,x$ of Fig. 7.

In Figs. 1, 8, &c., C represents the rotary clamping-wheel, which encircles the tyer-spindles. It bears centrally upon and around a hub, f, formed on a non-rotating plate, D. The plate D surrounds and slides vertically upon a fixed tubular post, E, which surrounds the outer tyer-spindle, as clearly represented in Fig. 8.

The clamping-wheel consists of a disk provided with notches or openings at regular intervals around its periphery, and with a circumferential groove, h, in its edge, as shown. The wheel lies between the supporting-plate D and a top plate, F, which are connected firmly with each other by screws and intermediate plates or thin blocks l, holding them apart to prevent excessive friction upon the faces of the wheel. The outer edges of the plates D F, which jointly with the plates l form a shell or casing for the wheel, are recessed, as shown at i, to permit the cord to fall into the notches of the wheel, and in order to retain the cord in position the recesses in the plates have a lip or hook, k, formed at one side, as shown in Figs. 1, 2, 7, &c. The spool end of the cord is clamped and retained between the wheel and the plate B.

In order to render the clamping action more certain and secure, the small rigid plate or tongue l is secured to the plate D, and arranged to extend into the groove in the edge of the wheel, as shown in Figs. 1, 2, 6, and 13. This plate serves to bend and pinch the cord into the edge of the wheel as the latter carries it forward, thus causing a firm hold to be taken.

The severing of the applied band is effected by means of a stationary knife, G, secured to or formed upon the top plate, F, with its edge in position to act closely against the upper surface of the wheel.

The pinching and cutting action is as follows: The spool end of the cord being clamped between the wheel C and plate D, the cord is extended around the bundle and downward through one of the notches in the edge of the wheel and the notches in the plate D F, as indicated in Fig. 1, &c. At this instant the knotting-fingers engage both cords and form them into a loop, and while this is going on the holder is lifted up to provide the slack to form the knot, as hereinafter described. The wheel being then turned forward carries the cord forward, and bends it between it and plate D and around the edge of tongue l, taking a new firm hold thereon, and at the instant this is effected the cord is also carried by the wheel against the fixed knife and severed, as will be understood on reference to Figs. 7 and 14, thereby releasing the applied band, and thus permitting the completion of the knot by the stripper, which at the instant the cord is cut is moved forward to strip the loop from the fingers.

As before stated, the clamping device is moved to and from the tyer. When the binder-arm carries the band around the bundle the clamp is lowered away from the tyer, as represented in Fig. 1; but as the tyer forms the loop the clamp gradually rises until it stands closely beneath the tyer, as shown in Figs. 3 and 4.

The mechanism for elevating and depressing the clamp and operating the tying-fingers is clearly shown in Figs. 6, 7, 8, and 10.

The tubular post E, in which the tyer-spindles are mounted, is attached rigidly to a bed-plate, H, which is provided with upright guides or ways I engaging with the edges of plate D, permitting the latter, with the wheel and knife, to slide vertically. On the side of the plate D there is journaled a roller, J, which enters an irregular slot, K, in an upright plate, L, which latter reciprocates with the knotter-operating rack. As the slotted plate moves in the direction indicated by the arrows its slot causes the roller to raise the plate D and lift the clamp to the tyer, and as the plate moves in the opposite direction the clamp is lowered. The upper end of the slot extends horizontally, and serves to hold the clamp in the elevated position during the completion of the knot.

It will be observed that the slot has a short upward curvature at the point $m$. This is for the purpose of raising the cord-clamp momentarily to an extreme height for the purpose of guiding the cord after the formation of the loop first over the under tying-finger, and then downward beneath the upper finger previous to their closing thereon. This movement of a cord-guiding device to and fro in a direction at right angles to the plane in which the tyer revolves is an important feature. It is obvious that any suitable device may be used to thus carry the cord.

In the practical operations with cord-tying devices much trouble is experienced from the accumulation of the small waste ends of the cord, lint, &c., in the clamping mechanism. To overcome this trouble I provide the bed-plate of the tying mechanism with a rigid clearer-arm, $o$, so located that at each descent of the clamping device the arm passes through one of the notches or openings in the clamping-wheel. This clearer-arm, in connection with the clamping-wheel, is a feature of importance. It may be varied in form, as desired, and in machines in which the clamping-wheel is stationary the clearer-arm may be caused to move back and forth through the openings in the clamp.

Figure 5:
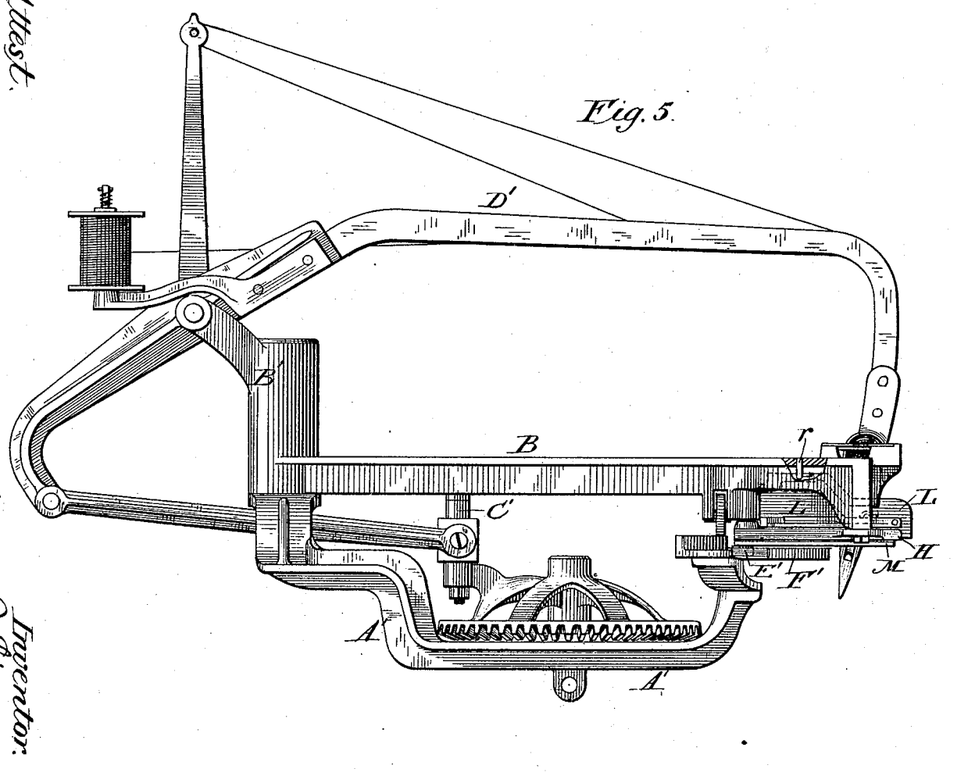
Fig. 5 represents a side elevation of my binding-machine separated from the harvester, the binding or grain-receiving table being omitted.
Figure 6:
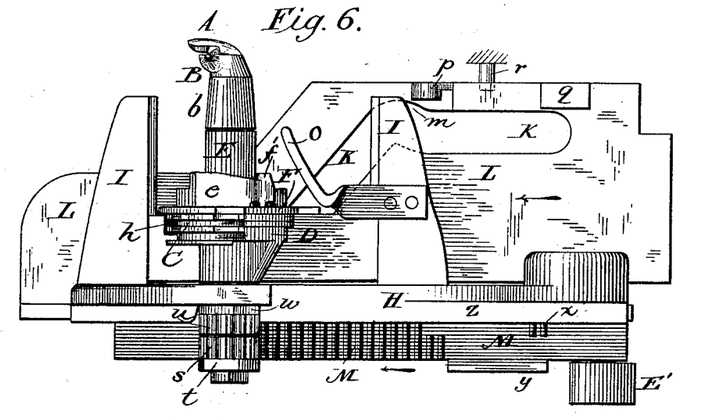
Fig. 6 is a side elevation of the cord tying and clamping devices, and the operating devices connected immediately therewith.

As a means of imparting the required intermittent rotation to the clamping-wheel, the reciprocating plate L is provided with a pivoted dog, $p$, and a stationary shoulder, $q$, as in Figs. 6 and 7. As the plate L moves during the formation of the knot after it has elevated the clamp the dog $p$ engages in one of the notches of the clamp-wheel and turns the same forward until the cord is severed and the succeeding end secured, as before explained. After the dog passes the wheel it is followed by the shoulder $q$, which in turn acts upon the wheel, so as to continue its rotation and the more positively insure the proper adjustment of the same. During the backward movement of the dog-carrying plate the dog yields in passing the wheel and swings back without moving the same. The dog is again set in an operative position at the completion of its backward movement by coming in contact with a fixed stud, $r$, (shown in Figs. 5, 6, and 7,) which obviates the employment of a spring.

The means for rotating the tyer-spindles are clearly represented in Figs. 6 and 7. The central spindle, carrying the upper finger, A, is provided on its lower end with a pinion, $s$, having at one side a circular collar or enlargement flattened on one side, as shown at $t$. The tubular shaft of the lower tying-finger is provided with a pinion, $u$, which is also provided with a side collar or enlargement, having on one side a flattened face, $w$. These flattened faces, which are somewhat raised or constructed in line with the top of the teeth, are for the purpose of locking against corresponding faces of the rack-bar M to hold the pinions and fingers in position, as hereinafter explained. The pinions receive a rotary reciprocating motion from teeth formed on the side of a reciprocating rack-bar, M, this bar being mounted in a guide or guides, as shown in Fig. 8, on the under side of the bed-plate, and secured to or formed in one piece with the reciprocating plate L. As shown in Fig. 6, the rack-bar is provided, for a portion of its length, with teeth extending across its entire face and engaging with both pinions, so that during the forward motion of the rack-bar, while the tying-fingers are forming the loop of the knot, and while the cord-clamp is being elevated, the two pinions and the tying-fingers are revolved together, the fingers standing during this period in an open position, as shown in Figs. 1, 2, and 3.

Near the end of the long teeth on the rack-bar two teeth are cut away at the upper end, so as to reduce their length and permit them to pass by the pinion $u$ without turning the same. This construction causes the lower pinion to be turned slightly past the upper one, thereby causing the upper tying-finger to turn forward and close over or upon the lower finger to grasp the ends of the cord. Near the end of the rack-bar there are on its upper edge two short teeth, which serve to operate the pinion $u$ independently of the pinion $s$ for the purpose of opening the tying-fingers apart when the knot is to be released. At the instant that the fingers grasp the cord, as above described, the two flat surfaces on the disks of the pinions are caused to register the one with the other, and both resting against the flat surfaces $y$ and $z$ on opposite sides of the rack-bar cause the knotting bills or fingers to have a short interval of rest while the stripper-plate moves forward and strips the loop off of the tying-fingers, the arrangement of the flat surfaces $y$ and $z$ on the rack-bar in relation to the teeth being such as to first hold the upper pinion against rotation while the lower pinion closes the upper finger over the lower one to clamp the cord, and then cause both to have an interval of rest for the purpose above stated, and finally to permit the upper pinion to be rotated in advance of the lower one by the teeth for the purpose of opening the tying-fingers to release the knot and permit the bundle, after it is bound, to be discharged from the machine. During the formation of the knot the rack-bar moves in the direction indicated by the arrow in Fig. 6, causing them to turn forward in an open position until the loop has been formed, after which the fingers are closed together to grasp the ends of the cord to be drawn through the loop, and finally opened again to release the completed knot, as before explained. The secondary opening, $i'$, in the stripper-plate T is an important feature, in that it prevents the possibility of the plate riding over the loop of the knot and binding or wedging the same between it and the top of the fingers of the tyer, the edge of the opening engaging directly against the loop surrounding the fingers after it has been forced over the incline on the rear side of the two fingers by the first edge coming against the two strands of the cord close to the bundle.

To prevent the cord from being caught and disarranged by the tyer-fingers in their backward revolutions, I make the stripper-plate of sufficient length and width to completely cover the fingers when moved forward to strip the loop, in which position it remains until nearly the extreme limit of the backward rotations of the tying-fingers, when it is caused to move back, by means before described, to bring the opening $h'$ in position to carry the cord within the path of rotation of the fingers in their forward revolution.

It will be observed that the construction and arrangement of the stripper-plate is such that during the backward rotation of the tying-fingers it serves to hold the cord beyond their path of rotation, or, in other words, out of their reach.

The throat-plate I' is cut away, as shown, to admit the point of the binder-arm and cord, and also to permit the movement of the cord as it is being stripped from the tying-fingers, and is secured to the top of the end of the vibrating arm B' in close proximity to the stripper-plate T, which, when in position to present the cord to the tyer, is sufficiently wide on its opposite side to close the opening in the throat-plate, and leave only so much of it exposed as is over the notch $h'$ in the stripper-plate, thereby preventing the tyer-fingers from being clogged with straw, weeds, &c.

Figures 9, 13, 14:
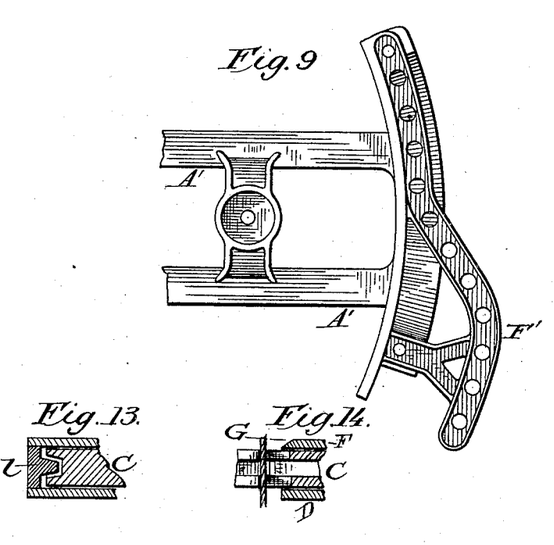
Fig. 9 is a top plan view of the stationary cam-track by which motion is communicated to the tying and clamping devices.
Figs. 13 and 14 are vertical sections representing respectively the cord-clamping and the cord-cutting devices.

It will be seen that the knot-tying fingers are formed on the upper end of vertical spindles, and revolve close to the stripper and throat-plate. Under this organization the knot is tied close to the bundle without the usual amount of slack in the band, and is a feature of no secondary importance, inasmuch as it obviates the necessity of the employment of complicated and powerful compressing machinery, as is the case where the expansion of the bundle is relied on to tighten the band. The stationary cam-track, by which the whole knotting mechanism is operated, is rigidly secured to the end of the main frame A', supporting the binding mechanism, as shown in Figs. 5 and 9.

The binding-machine I have illustrated in the accompanying drawings is designed for attachment with or to a harvester in substantially the same manner as shown in my patent of January 7, 1879, No. 211,150, and provided with a stationary receptacle, substantially the same as shown in said patent.

It will be seen that by connecting the slotted plate L, which both elevates and rotates the clamp, and the rack-bar which rotates the fingers with each other, as well as the cam-surfaces that operate the stripper, the parts are caused to operate in perfect harmony, and that a disarrangement is rendered impossible.

Figure 12:
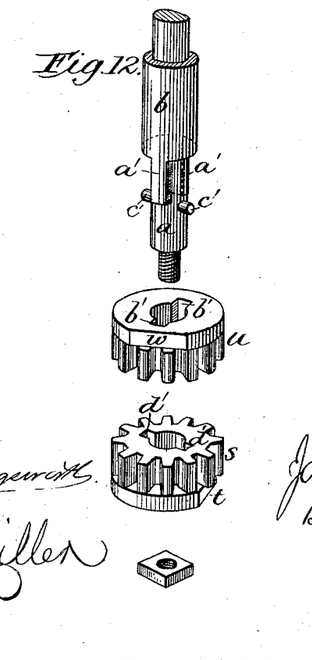
Fig. 12 is a view illustrating the two spindles of the knotting device and the pinions for operating the same, the parts being disconnected in order to show the manner in which they are united to each other.
Figure 15:
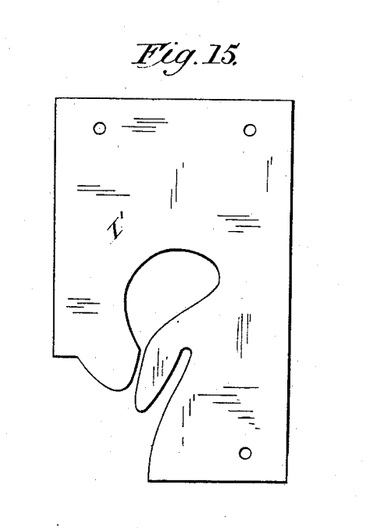
Fig. 15 is a top plan view of the top or throat plate, located in the machine above the knotting devices, as represented in Fig. 5.

As a means of securing the pinions to the tyer-spindles, I have adopted the construction represented in Fig. 12, the hollow spindle $b$ having its lower end cut away on opposite sides, so as to leave two depending-fingers, $a'$, which enter corresponding slots, $b'$, in the pinion $u$. The central spindle, $a$, passes loosely through a central hole in the pinion $u$ and into a corresponding hole in the lower pinion, $s$, and is provided with a transverse pin, $c'$, the ends of which are seated in notches $d'$, formed in the upper part of pinion $s$. The two pinions are held upward to their places, and prevented from falling off by means of a nut screwed upon the lower end of the inner spindle.

The peculiar manner of attaching the pinions above described is advantageous, in that it permits the parts to be fitted very cheaply and firmly, avoids the necessity of drilling a large hole in and keying or pinning the pinion to the hollow spindle, which sometimes is very difficult to do firmly, especially when the spindle is very thin, as in the present instance, thereby weakening the upper pinion, as usual, and in that it permits the parts to be readily separated and reassembled without the possibility of a mistake in their adjustment.

In order that the tying-cord may be presented with certainty in the proper position with reference to the tying-fingers, a raised flange or guide, $b^2$, is secured on top of the clamping mechanism, as represented in Figs. 1, 2, 3, 4, &c., this guide being provided at one end with a raised stud or shoulder, $f'$, against which the cord is drawn.

When the device is elevated to its highest point the flange or guide $b^2$ serves to force the cord upward to or above the level of the lower finger, in order to facilitate its action upon the same, the effect being to bend the cord to a horizontal position, as indicated in Figs. 3 and 4.

Figure 11:
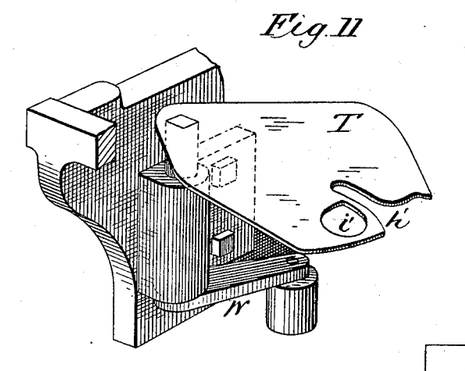
Fig. 11 is a perspective view of the stripper or clearer, and the crank-arm for operating the same.

For the purpose of insuring the presentation of the cord in the proper relative position to the fingers, and of stripping the knot with certainty from the tyer, I make use of a horizontal vibrating plate, T, attached to the end of a vertical rock-shaft, U, as represented in Figs.

8 and 11. The vertical shaft is provided at its lower end with a crank-arm, W, having at its outer end a roller or stud, which is acted upon by inclined faces connected to and carried with the reciprocating plate H, as shown at X, Figs. 7 and 8.

It will be understood that the bearing or support in which the vertical shaft is mounted will be bolted to any part of the machine which remains stationary in relation to the tyer.

The stripper-plate is made of thin steel and preferably somewhat elastic in a vertical direction, and is provided, as shown, with a notch or opening, $h'$, to receive and guide the binding-cord, and also with an opening, $i'$. At the completion of the knot, the instant that the same is to be stripped from the tyer, the plate receives a horizontal vibration by the means before described, which causes it to crowd against the two strands of cord close to the fingers, but in advance of the loop, which is now brought in the opening $i'$, the edge of which latter now engages directly against the loop of the cord, greatly assisting in forcing the same off over the end of the fingers, and insuring a more positive discharge of the same. The position of this plate with reference to the other parts is represented in dotted lines in Fig. 7.

The mechanism heretofore described constitutes a complete knotting mechanism which may be employed in binders of various kinds, as commonly known and used in the art. As before stated, I prefer, however, to apply the tying device to the vibrating form of the machine, as represented in my previous patent, and the manner in which this is accomplished and the device is operated are clearly represented in Figs. 5 and 9, A' representing the base of the machine, and B' representing the horizontally-vibrating arm forming the lower part of the binder proper. This arm B' is moved to and fro by means of a crank-arm, C', as described in my Patent No. 211,150.

D' represents the binder-arm, pivoted to the arm B', and arranged to vibrate horizontally in unison therewith, and also arranged to rise and fall at the proper intervals, in order to carry the binding-cord around the grain and present the same to the tying devices in the same manner as shown and explained in my last pending application.

In applying the tying mechanism described, the bed-plate H is bolted firmly to the under side of the vibrating arm B', and a roller, E', applied to the under side of the reciprocating rack M, and arranged to travel in a horizontal cam-track, F', formed upon the stationary bed-plate, as represented in Fig. 9. As the arm B' vibrates the cam-track F' imparts to the plate M the necessary reciprocating movement to operate the tying devices. The pin for resetting the clamp-operating dog. $p'$ is seated in the arm B', as shown in Fig. 5 of the drawings.

It will thus be seen that, through the simple medium of the stationary cam-track, roller, and reciprocating plate, motion is imparted to all the operating parts of the tying, holding, and cutting devices.

By the expression "tying-fingers," as used in the foregoing specification, are meant fingers which co-operate to wind the cord into a loop, and also to draw the ends through said loop for the purpose of forming a knot, and they do not include those tubular devices which serve merely to wind the cord into a loop through which the ends are drawn by means of a third and independent device.

I am aware that it is old in grain-binders to provide a cord-clamping device which is movable toward the knotting mechanism during the formation of the knot, and this I do not claim.

The present invention is restricted to those matters and things specifically claimed herein, and as to all features and combinations of devices which may be shown or described, but not claimed, the right is reserved to make the same the subject of a separate application.

Having thus described my invention, what I claim is—

1. A knot-tying head consisting of two differentially-rotating tying-fingers arranged to move concentrically in planes lying at substantially right angles to the axis of rotation, said fingers provided on their opposite faces with the respective cord-retaining lips abutting against each other when the fingers overlap, substantially as described and shown.

2. The combination of two concentric differentially-rotating tying-fingers provided on their opposite sides with lips abutting against each other when the fingers overlap, substantially as shown.

3. A cord-tying device consisting of two differentially concentrically-rotating fingers, said fingers constructed to close together by a rotary motion parallel with each other in planes at substantially right angles to the axis of rotation, and thereby confine the cord between their adjacent faces, as set forth.

4. A cord-knotting device consisting of two concentric differentially-rotating fingers, each extending from its axis in one direction only, as contradistinguished from fingers having a heel-projection.

5. The combination of the knotting-fingers arranged to revolve in parallel planes lying at right angles to the axis of rotation, and actuating mechanism, substantially as described, whereby the fingers are rotated differentially an entire revolution or more in a forward direction, as described, whereby the formation and completion of the knot in the cord are effected without a backward rotation of the finger.

6. The combination of the two knotting-fingers adapted, as described, for independent rotation in parallel planes, and to grasp the ends of the cord between their adjacent faces, in combination with actuating mechanism, substantially as described, whereby the fingers are turned apart, revolved while separated a complete revolution, or thereabout, to form a loop, closed together to seize and retain the ends of the cord until the loop has been cast off from their ends, and finally turned apart to release the completed knot.

7. A knot-tying head consisting of two differentially-rotating tying-fingers extending at right angles to the axis of rotation, and adapted to admit the cord between their adjacent faces, in combination with actuating devices, substantially as shown, for imparting the differential rotations thereto to grasp and release the end of the cord.

8. In a tying device, the combination of two concentric spindles, a laterally-projecting finger attached to the end of each spindle and extending therefrom in one direction only, and mechanism, substantially as described, whereby the spindles are rotated differentially and positively, substantially as described and shown.

9. The combination of two fingers revolving differentially in parallel planes, and adapted to complete a knot during their forward rotation, with a stripping device, substantially as shown, which is advanced to remove the knot from the fingers.

10. In combination with the tying-head, the movable stripper-plate provided with an opening, $i'$, substantially as shown, for the purposes set forth.

11. In combination with the tying-head, the elastic stripper-plate provided with an opening and arranged to bear upon the end of and over the tying-head, as described.

12. The movable stripper-plate provided with the cord-guiding notch, and also with the edge or surface to engage directly with the knot upon the tying-fingers, substantially as shown.

13. The cord-clamping device mounted around the tyer-shaft and movable lengthwise thereof, substantially as described and shown.

14. The combination of the rotary tying-head and the rotary cord-clamping wheel arranged concentrically, and suitably actuated mechanism, substantially as described, whereby the clamping-wheel is moved without being rotated toward the tyer-head during the time that the latter is turned in a forward direction to form the knot, whereby the cord is slackened with a positive regular action to the tying device during the formation of the knot, and at the same time retained by the clamping-wheel.

15. The combination of a tyer-shaft, a tubular bearing therefor, and a cord-clamping wheel mounted upon and around said bearing.

16. The combination of a knotting-head and a cord-clamping wheel rotating in parallel planes, the wheel being movable to and from the head, substantially as described and shown.

17. In combination with the tying-fingers, which revolve differentially in parallel planes, a cord guide or presenting device and mechanism which moves the same in a direction transverse to the fingers, first carrying the cord over one finger and then changing its position to carry the cord beneath the other finger.

18. In combination with the two tying-fingers, as described, the reciprocating clamping-wheel and its casing provided with the cord-guiding lip or flange $e$, arranged to rise past the ends of the fingers, as described and shown.

19. The combination of the cord-clamping wheel having the grooved periphery, the clamping-plate D beneath the wheel, and the plate or lip $l$, entering the groove of the wheel, as described and shown.

20. The combination, with the rotary tyer-head, of a concentric rotary clamping-wheel movable to and from said head, the non-rotating shell or casing for said wheel, and the fixed knife upon said casing.

21. In combination with the notched cord-clamping wheel, a clearer arranged to pass transversely through the notched edge of the wheel, substantially as described, to remove the waste ends, lint, &c.

22. In combination with the fixed clearer-arm, the movable clamping device adapted to pass over and co-operate with the clearer-arm, in the manner described and shown.

23. The combination of the rotary clamping-wheel, the sliding support therefor, and the reciprocating plate provided with a slot to effect the raising and lowering of the sliding support.

24. In combination with the knotting-head and the clamping device having a guide, $b''$, the reciprocating plate having the slot for raising and lowering the clamp, provided with an elevated portion, as described, whereby the clamp and cord are momentarily elevated to an extreme height to effect the proper presentation of the cord to the fingers.

25. The combination of the cord looping and tying fingers revolving differentially in parallel planes, their spindles, the two operating-pinions provided with flat faces, and the reciprocating rack-bar provided with mutilated teeth and with the two flattened faces located at opposite sides of the rack on the bar, as shown.

26. In combination with the knotting-head, the vibrating stripper-plate operating against the end of the knotter, as and for the purpose described, the shaft and crank-arm attached to the stripper, and the reciprocating bar or plate provided with the two cams or inclines X X', for vibrating the stripper, as set forth.

27. The combination of the two independently-rotating tying-fingers, their spindles, the two operating-pinions, provided each with a flat face, and the reciprocating rack-bar provided with the mutilated teeth at two points, as shown, and with the two flattened faces at opposite sides of the rack, as described and shown.

28. In combination with the clamping-wheel, the reciprocating plate having the yielding dog and the rigid stud, arranged to act successively in turning the wheel, as described and shown.

29. In combination with the reciprocating cord-clamping device and the tyer-pinions, the reciprocating plate L, provided with the rack-bar to operate the pinions and the slot to move the clamp, and the cam-track F, whereby the reciprocating motion is imparted to the plate.

30. The slotted bed-plate, in combination with the connected plate L and M, on opposite sides thereof.

31. The combination of the tubular tyer-shaft, having the extended arms $a'$, and the pinion slotted to fit thereon.

32. The tubular tyer-shaft $b$, provided with the arms $a'$, turning the pinion seated thereon, in combination with the central tyer-shaft extending through and beyond the tubular shaft and its pinion, and provided with the transverse pin $c'$ and the pinion seated thereon.

33. A rotary knotting device adapted to be reversed after completion of the knot, in combination with the clearer-plate adapted to strip the loop from the tying-bills and then hold the cord out of the path of rotation of the tyer-bills during their backward revolutions, substantially as set forth.

JAMES F. GORDON.

Witnesses:
WILLIAM GOMM,
CHARLES A. COLWELL.